(12) United States Patent
Kan et al.

(10) Patent No.: US 12,050,104 B2
(45) Date of Patent: Jul. 30, 2024

(54) MEMS GYROSCOPE

(71) Applicant: AAC Kaitai Technologies (Wuhan) CO., LTD, China (CN)

(72) Inventors: Xiao Kan, Shenzhen (CN); Zhan Zhan, Shenzhen (CN); Zhao Ma, Shenzhen (CN); Shan Yang, Shenzhen (CN); Shitao Yan, Shenzhen (CN); Hongtao Peng, Shenzhen (CN); Yang Li, Shenzhen (CN); Kahkeen Lai, Singapore (SG); Veronica Tan, Singapore (SG); Yan Hong, Shenzhen (CN)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 237 days.

(21) Appl. No.: 17/873,194

(22) Filed: Jul. 26, 2022

(65) Prior Publication Data

US 2023/0213338 A1 Jul. 6, 2023

(30) Foreign Application Priority Data

Dec. 31, 2021 (CN) .......................... 202111672568.4

(51) Int. Cl.
*G01C 19/5712* (2012.01)
(52) U.S. Cl.
CPC ................................ *G01C 19/5712* (2013.01)
(58) Field of Classification Search
CPC .................................................. G01C 19/5712
See application file for complete search history.

(56) References Cited

U.S. PATENT DOCUMENTS

| | | | | |
|---|---|---|---|---|
| 5,377,544 A * | 1/1995 | Dunn | ................. | G01C 19/5719 73/504.08 |
| 5,535,902 A * | 7/1996 | Greiff | ................. | G01P 15/0802 216/2 |
| 5,869,760 A * | 2/1999 | Geen | ...................... | H02N 1/008 73/504.04 |
| 6,062,082 A * | 5/2000 | Guenther | ........... | G01C 19/5712 73/504.03 |
| 6,250,157 B1 * | 6/2001 | Touge | ................. | G01C 19/5719 73/504.12 |

(Continued)

*Primary Examiner* — David J Bolduc
(74) *Attorney, Agent, or Firm* — W&G Law Group

(57) ABSTRACT

A MEMS gyroscope includes an anchor point, at least two driving structures connected with the anchor point; a mass group connected with the driving structures, and coupling beams connected with adjacent driving structures. The mass group includes two detecting components arranged on opposite sides of the driving structures and connected with the driving structures. Each of the detecting components includes two mass blocks arranged at intervals and detecting transducers arranged below or above the mass blocks. The mass blocks are connected with the driving structures. At least portions of the mass blocks extend to outsides of the driving structures. The mass blocks and the detecting transducers are symmetrically arranged, which is convenient for realizing differential detection. In an out-plane oscillation mode, most portions of the mass blocks sense an angular velocity. By adopting detecting transducers, electromechanical coupling coefficient of detection is effectively improved, and sensitivity and signal-to-noise ratio are improved.

10 Claims, 5 Drawing Sheets

(56) References Cited

U.S. PATENT DOCUMENTS

| | | | |
|---|---|---|---|
| 6,848,304 B2* | 2/2005 | Geen | G01P 15/18 73/504.04 |
| 7,591,179 B2* | 9/2009 | Krieg | G01C 19/5712 73/504.12 |
| 2006/0272410 A1* | 12/2006 | Mao | G01C 19/5719 73/504.02 |
| 2007/0214883 A1* | 9/2007 | Durante | G01P 15/125 73/504.04 |
| 2008/0092652 A1* | 4/2008 | Acar | G01C 19/5712 73/504.02 |
| 2009/0064780 A1* | 3/2009 | Coronato | G01P 15/18 73/504.08 |
| 2009/0100930 A1* | 4/2009 | Coronato | G01C 19/5712 73/504.12 |
| 2010/0126269 A1* | 5/2010 | Coronato | G01C 19/56 73/504.04 |
| 2010/0126272 A1* | 5/2010 | Coronato | G01C 19/5712 29/829 |
| 2010/0154541 A1* | 6/2010 | Cazzaniga | B81B 3/0018 73/504.12 |
| 2010/0199764 A1* | 8/2010 | Hammer | G01C 19/5712 73/504.12 |
| 2011/0030474 A1* | 2/2011 | Kuang | G01C 19/5712 73/504.16 |
| 2011/0094301 A1* | 4/2011 | Rocchi | G01C 19/5712 73/504.08 |
| 2011/0303007 A1* | 12/2011 | Rocchi | G01C 19/574 73/504.09 |
| 2012/0006123 A1* | 1/2012 | Walther | G01C 19/5712 73/774 |
| 2013/0086985 A1* | 4/2013 | Lin | G01C 19/5712 73/504.12 |
| 2013/0269469 A1* | 10/2013 | Rocchi | G01C 19/04 74/5 F |
| 2014/0060184 A1* | 3/2014 | Walther | G01P 15/123 73/504.03 |
| 2014/0352431 A1* | 12/2014 | Leclerc | G01P 15/18 73/504.04 |
| 2016/0187137 A1* | 6/2016 | Rinkiö | G01C 25/00 216/13 |
| 2018/0259335 A1* | 9/2018 | Giner | B81B 3/0048 |
| 2019/0346264 A1* | 11/2019 | Kuisma | G01C 19/5684 |
| 2019/0346266 A1* | 11/2019 | Kuisma | G01C 19/5684 |
| 2020/0263987 A1* | 8/2020 | Blomqvist | G01C 19/574 |
| 2020/0263989 A1* | 8/2020 | Blomqvist | G01C 19/5712 |
| 2020/0263990 A1* | 8/2020 | Kuisma | G01C 19/5712 |
| 2021/0247186 A1* | 8/2021 | Kuisma | G01C 19/5684 |
| 2021/0364291 A1* | 11/2021 | Blomqvist | G01C 19/574 |
| 2021/0372794 A1* | 12/2021 | Blomqvist | G01C 19/574 |
| 2022/0316882 A1* | 10/2022 | Ma | G01C 19/5712 |
| 2022/0417671 A1* | 12/2022 | Dan | B81B 3/0037 |
| 2023/0130249 A1* | 4/2023 | Yang | G01C 19/5712 73/504.12 |
| 2023/0131683 A1* | 4/2023 | Tseng | G01C 19/5712 73/504.12 |
| 2023/0199410 A1* | 6/2023 | Wang | H04R 1/04 381/174 |

\* cited by examiner

MEMS GYROSCOPE

TECHNICAL FIELD

The present disclosure relates to a technical field of gyroscopes, and in particular to a MEMS gyroscope based on a rotation mode.

BACKGROUND

Micromachined gyroscope, also known as micro-electromechanical system (MEMS) gyroscope, is a miniature angular velocity sensor produced by applying micromachining technology and microelectronic technology. Due to advantages of small size, low power consumption, and convenient processing, the MEMS gyroscopes have a very wide range of applications in the consumer electronics market. In recent years, with gradual improvement of performance of the MEMS gyroscopes, the MEMS gyroscopes are widely used in automotive, industrial, virtual reality and other fields.

MEMS out-of-plane oscillating gyroscope is a typical representative of MEMS out-of-plane detecting gyroscopes. In a drive mode, a MEMS oscillating gyroscope oscillates around an axis perpendicular to mass blocks. When an angular velocity Ω is applied, the MEMS oscillating gyroscope transfers energy and is switched to a sense mode due to the Coriolis effect, which indirectly drives a vibrating disk to oscillate out-of-plane. A value of the angular velocity Ω is obtained by detecting a displacement of the out-of-plane oscillation.

The MEMS oscillating gyroscope in the prior art is unable to realize differential detection of all axes, and has low sensitivity.

SUMMARY

A purpose of the present disclosure is to provide a gyroscope that is convenient to realize differential detection and has high sensitivity.

The present disclosure provides a MEMS gyroscope based on a rotation mode. The MEMS gyroscope based on the rotation mode comprises an anchor point, at least two driving structures elastically connected with an outer side of the anchor point; a mass group connected with the driving structures, and coupling beams connected with adjacent driving structures. The mass group comprises two detecting components respectively connected with one side of each of the driving structures away from the anchor point. The two detecting components are arranged on opposite sides of the driving structures. Each of the detecting components comprises two mass blocks arranged at intervals and detecting transducers arranged below or above the mass blocks. The mass blocks are connected with the driving structures. At least a portion of each of the mass blocks extends to an outside of a corresponding driving structure.

Furthermore, an included angle between one side of a first mass block of each of the detecting components away from a second mass block of each of the detecting components and one side of the second mass block away from the first block of each of the detecting components is less than 180°.

Furthermore, the driving structures comprise two connecting portions arranged on two opposite sides of the anchor point and two elastic portions arranged on the two opposite sides of the anchor point. Each of the elastic portions is connected with one side of a corresponding connecting portion away from the anchor point. The two elastic portions are arranged at intervals. Two ends of each of the elastic portions are respectively connected with the adjacent edges of the two detecting components.

Furthermore, each of the driving structures further comprises at least two flexible beams connecting the anchor point and a corresponding connecting portion. The anchor point comprises first accommodating grooves for accommodating the flexible beams.

Furthermore, each of the first accommodating grooves comprises a main groove close to the anchor point and a connecting groove extending from the main groove in a direction away from the anchor point. Each of the flexible beams comprises a connecting beam and a fixed beam. A first end of each connecting beam is connected with a corresponding connecting portion and a second end of each connecting beam is inserting into a corresponding connecting groove. A first end of each fixed beam is connected with a corresponding connecting beam and a second end of each fixed beam is connected with the anchor point. Each fixed beam is accommodated in ta corresponding main groove.

Furthermore, the coupling beams connect the two connecting portions.

Furthermore, the anchor point comprises second accommodating grooves for accommodating the coupling beams. Each of the second accommodating grooves comprises a mounting groove provided between the two connecting portions and two coupling grooves provided on opposite sides of the mounting groove. The coupling grooves have a same structure. Each mounting groove is communicated with corresponding two coupling grooves. One end of each of the coupling grooves close to the anchor point defines an opening. Each of the coupling beams comprises a mounting beam arranged in a corresponding mounting groove and two elastic arms. A first end of each of the elastic arms is connected with a corresponding mounting beam a second end of each of the elastic arms is connected with a corresponding connecting portion. Each of the elastic arms are arranged in a corresponding coupling groove and extends from a corresponding opening to connect with the corresponding connecting portion.

Furthermore, each of the detecting transducers comprises a positive electrode and a negative electrode. The positive electrode and the negative electrode of each of the detecting transducers are arranged above or below the two mass blocks of each of the detecting components. The positive electrodes and the negative electrodes of the detecting transducers are symmetrically arranged with respect to the anchor point and are separately arranged on a corresponding mass block of a corresponding detecting component.

Furthermore, the driving structures further comprise driving transducers arranged on the elastic portions.

Furthermore, each of the elastic portions comprises at least two mounting portions arranged on one side of a corresponding connecting portion away from the anchor point, a spaced portion arranged between the at least two adjacent mounting portions, and an outer peripheral portion arranged on sides of at least two mounting portions away from the corresponding connecting portion. The outer peripheral portion of each of the elastic portions is connected with the at least two mounting portions and the spaced portion of each of the elastic portions. The outer peripheral portion of each of the elastic portions is connected with edges of two adjacent detecting components. The driving transducers are arranged on the mounting portions.

A principle of the present disclosure is as follow:
In x-axis angle detection, the MEMS gyroscope has two vibration modes. A first mode is an in-plane vibration mode of the mass blocks, and a second mode is an out-plane oscillation mode of the mass blocks. By external driving force, the MEMS gyroscope is driven to vibrate in the two vibration modes. At this time, when the MEMS gyroscope is subjected to an x-axis angular velocity ω, according to the Coriolis principle, the angular velocity ω generates the Coriolis force along a z-axis direction, and the Coriolis force makes the MEMS gyroscope to vibrate in a y-axis sense mode. Finally, by detecting a vibration displacement of the MEMS gyroscope along the z-axis direction, the angular velocity ω is obtained.

In the MEMS gyroscope based on the rotation mode provided by the present disclosure, the mass blocks and the detecting transducers are symmetrically arranged, which is convenient for realizing differential detection. In the out-plane oscillation mode, most portions of the mass blocks are involved in sensing of the angular velocity. By adopting the out-of-plane large-area detecting transducers for detection, electromechanical coupling coefficient of detection of the MEMS gyroscope is effectively improved, and sensitivity and signal-to-noise ratio of detection of the MEMS gyroscope are improved.

DETAILED DESCRIPTION

Figure 1:
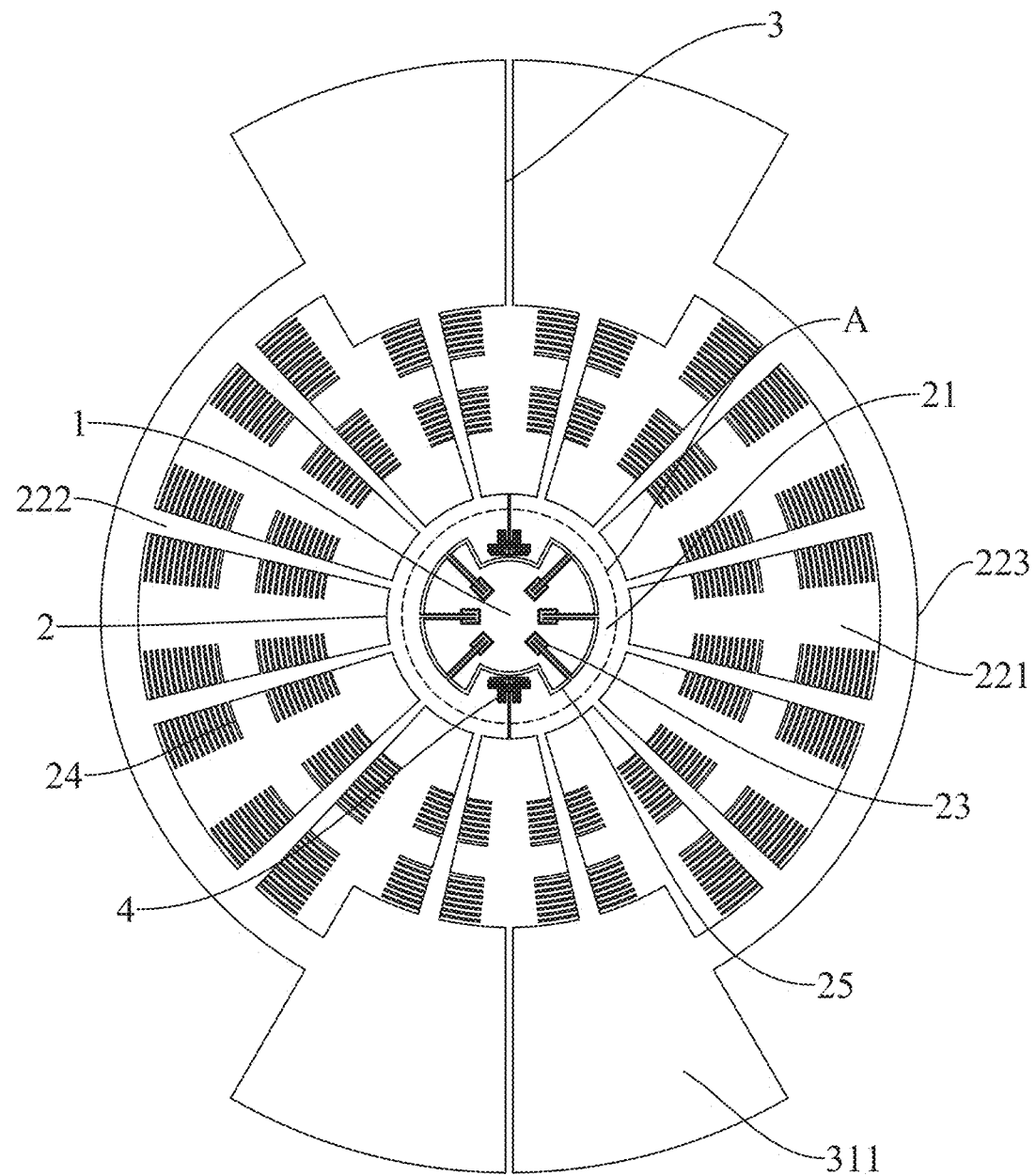
FIG. 1 is a schematic diagram of a MEMS gyroscope based on a rotation mode of the present disclosure.
Figure 2:
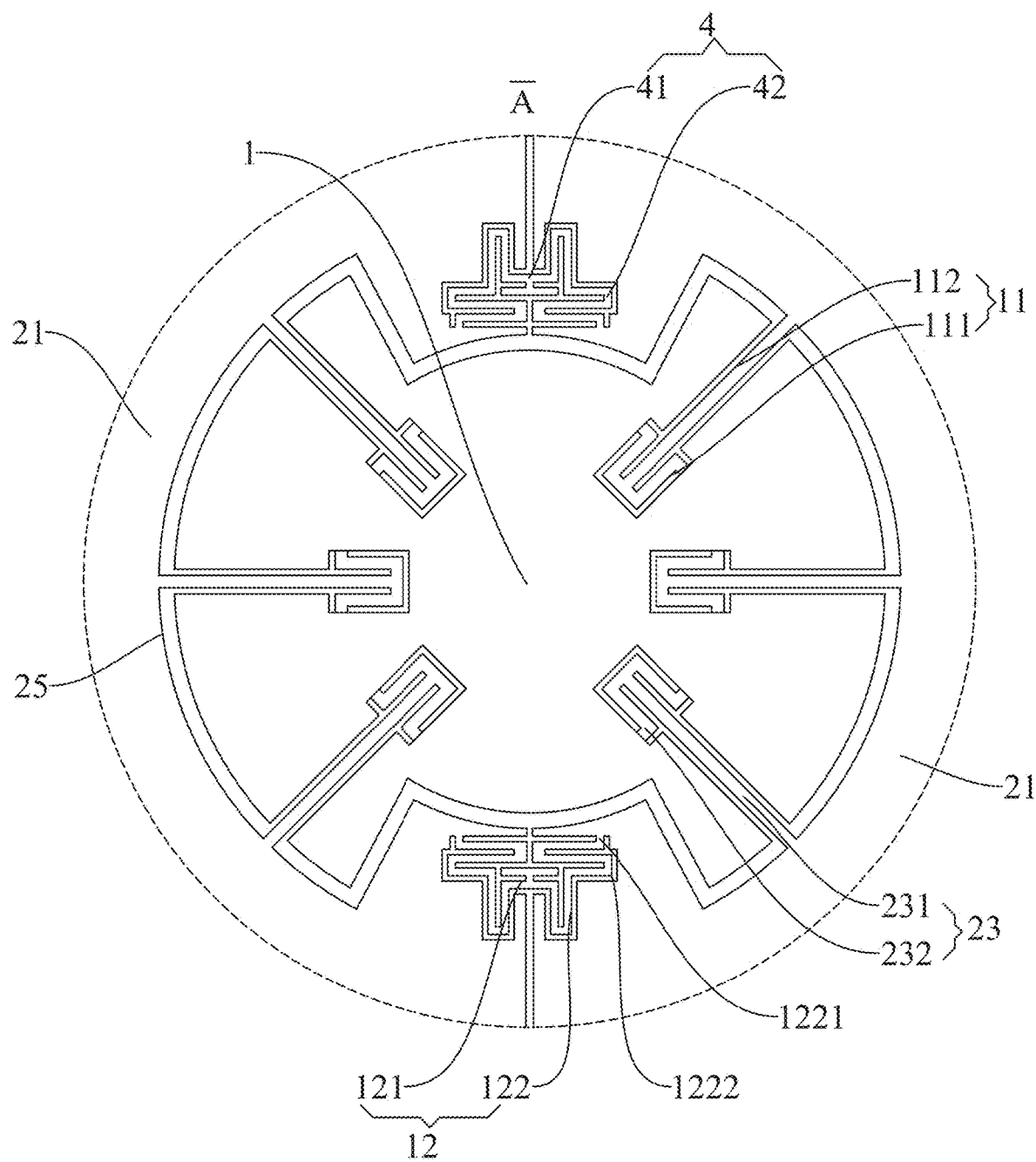
FIG. 2 is an enlarged view of portion A shown in FIG. 1.
Figure 3:
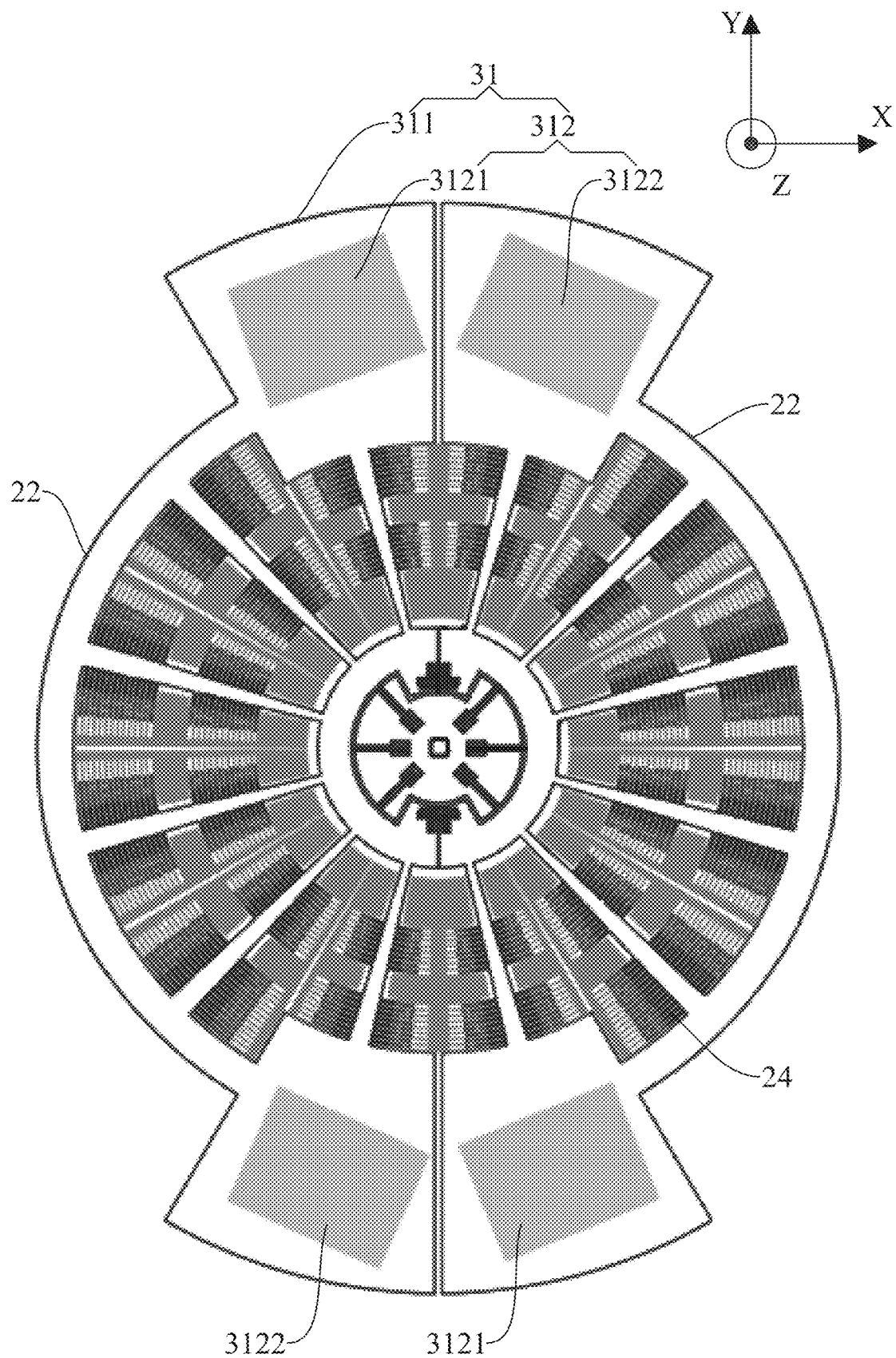
FIG. 3 is a schematic diagram showing a layout of the electrodes of the present disclosure.

The present disclosure will be further described below with reference to the accompanying drawings and embodiments.

As shown in FIGS. 1-5, the present disclosure provides a MEMS gyroscope based on a rotation mode. The MEMS gyroscope based on the rotation mode comprises an anchor point 1, at least two driving structures 2 elastically connected with an outer side of the anchor point 1; a mass group 3 connected with the driving structures 2, and coupling beams 4 connected with adjacent driving structures 2. The mass group 3 comprises two detecting components 31 respectively connected with one side of each of the driving structures 2 away from the anchor point 1. The two detecting components 31 are arranged on opposite sides of the driving structures 2. Each of the detecting components 31 comprises two mass blocks 311 arranged at intervals and detecting transducers 312 arranged below or above the mass blocks 311. The mass blocks 311 are connected with the driving structures 2. At least a portion of each of the mass blocks 311 extends to an outside of a corresponding driving structure 2.

Figure 4:
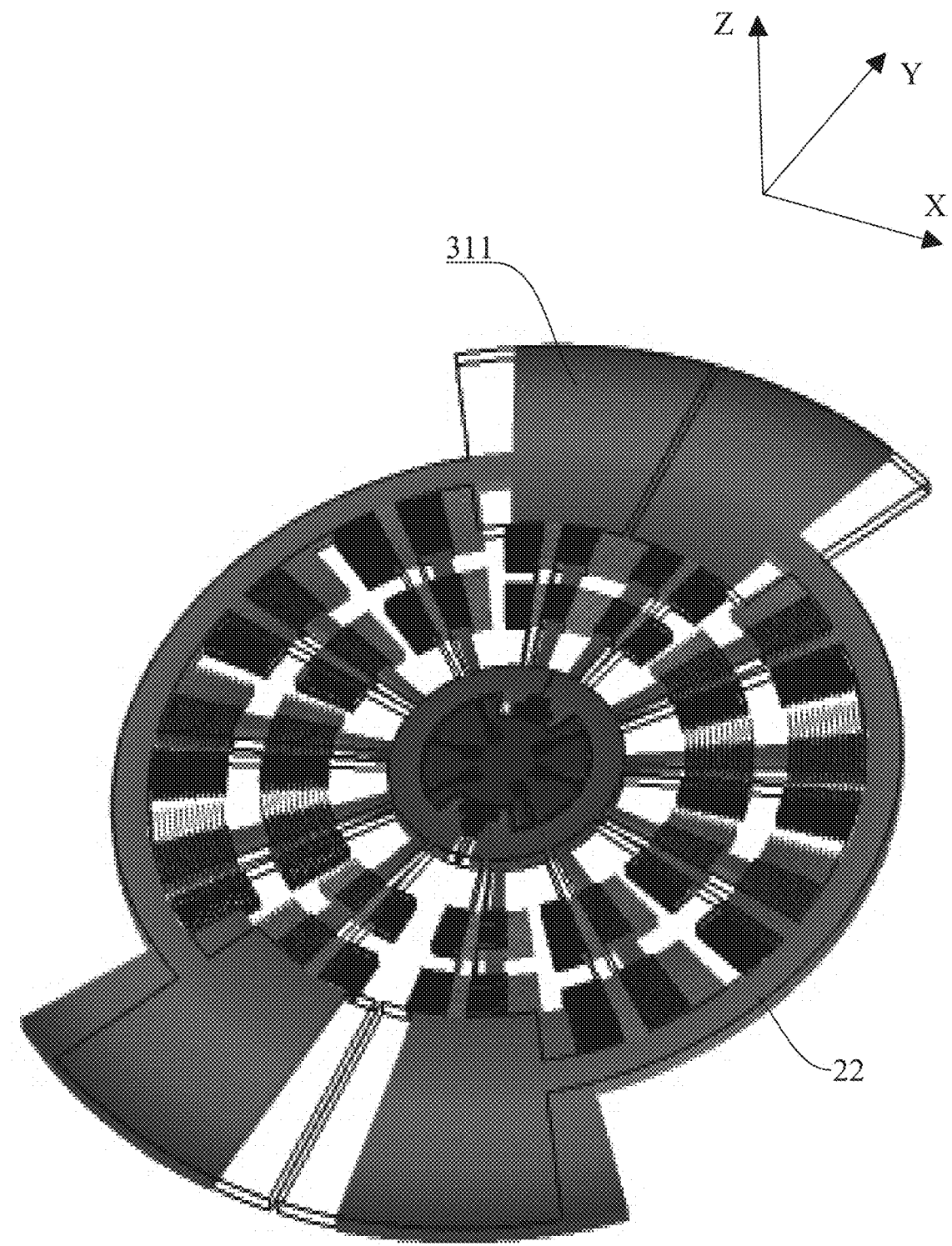
FIG. 4 is a schematic diagram of the MEMS gyroscope based on the rotation mode of the present disclosure shown in a drive mode.
Figure 5:
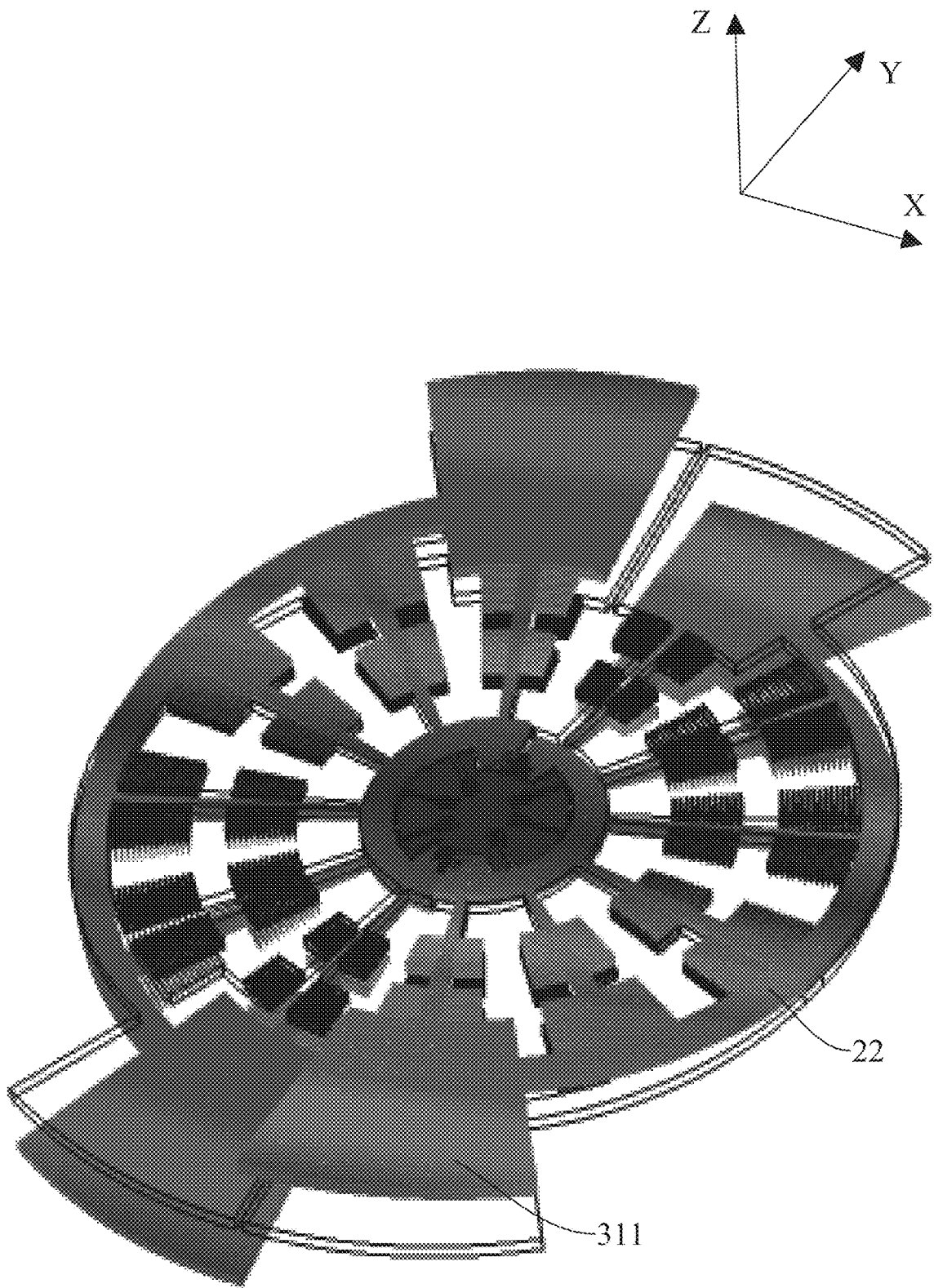
FIG. 5 is a schematic diagram of the MEMS gyroscope based on the rotation mode of the present disclosure shown in a sense mode.

In x-axis angle detection, the MEMS gyroscope has two vibration modes. A first mode is an in-plane vibration mode (as shown in FIG. 4) of the mass blocks, and a second mode is an out-plane oscillation mode 9 as shown in FIG. 5) of the mass blocks. By external driving force, the MEMS gyroscope is driven to vibrate in the two vibration modes. At this time, when the MEMS gyroscope is subjected to an x-axis angular velocity ω, according to the Coriolis principle, the angular velocity ω generates the Coriolis force along a z-axis direction, and the Coriolis force makes the MEMS gyroscope to vibrate in a y-axis sense mode. Finally, by detecting a vibration displacement of the MEMS gyroscope along the z-axis direction, the angular velocity ω is obtained.

In the embodiment, the anchor point 1 is arranged in a central area of the MEMS gyroscope. The mass blocks 311 and the detecting transducers 312 are symmetrically arranged, which is convenient for realizing differential detection. It should be noted that the detecting transducers 312 arranged below or above the mass blocks 311 means that the detecting transducers 312 are arranged below or above the mass blocks 311 along a z-axis direction (that is, the detecting transducers 312 are arranged below or above the mass blocks 311 along the Z-axis direction as shown in the coordinate axes of FIGS. 3-5). Through the driving structures 2 and the detecting transducers 312, coupling of the mechanical field and the electric field of the MEMS gyroscope is realized, which provides resonant driving force and angular velocity detection for the MEMS gyroscope.

In the in-plane vibration mode (also known as a drive mode) of the mass blocks 311, the two mass blocks 311 of each of the detecting components move concentrically around the anchor point 1 and perform anti-phase motion. In the out-plane oscillation mode (also known as a sense mode) of the mass blocks 311, the two mass blocks 311 of each of the detecting components 31 are opposite in phase and oscillate in opposite directions. In the out-plane oscillation mode of the mass blocks 311, most portions of the mass blocks 311 (most portions of the mass blocks 311 extending to the outside of the driving structures) sense the angular velocity. The MEMS gyroscope adopts out-of-plane large-area detecting transducers 312 for detection, which effectively improves the electromechanical coupling coefficient of gyroscope detection, and improves sensitivity and signal-to-noise ratio of detection of the MEMS gyroscope.

Furthermore, an included angle between one side of a first mass block 311 of each of the detecting components 31 away from a second mass block 311 of each of the detecting components 31 and one side of the second mass block 311 away from the first block 311 of each of the detecting components 31 is less than 180°.

The driving structures 2 comprise two connecting portions 21 arranged on two opposite sides of the anchor point 1 and two elastic portions 22 arranged on the two opposite sides of the anchor point 1. Each of the elastic portions 22 is connected with one side of a corresponding connecting portion 21 away from the anchor point 1. The two elastic portions 22 are arranged at intervals. Two ends of each of the elastic portions 22 are respectively connected with the adjacent edges of the two detecting components 31. Each of the driving structures 21 further comprises at least two flexible beams 23 connecting the anchor point 1 and a corresponding connecting portion 21. The anchor point 1 comprises first accommodating grooves 11 for accommodating the flexible beams 23.

Each of the first accommodating grooves 11 comprises a main groove 111 close to the anchor point and a connecting groove 112 extending from the main groove 111 in a direction away from the anchor point 1. Each of the flexible beams 23 comprises a connecting beam 231 and a fixed beam 232. A first end of each connecting beam 231 is connected with a corresponding connecting portion and a second end of each connecting beam 231 is inserting into a corresponding connecting groove 112. A first end of each fixed beam 232 is connected with a corresponding connecting beam 231 and a second end of each fixed beam 232 is connected with the anchor point 1. Each fixed beam 232 is accommodated in ta corresponding main groove 111.

The driving structures 2 further comprise driving transducers 24 arranged on the elastic portions 22. Each of the elastic portions 22 comprises at least two mounting portions 221 arranged on one side of a corresponding connecting portion 21 away from the anchor point 1, a spaced portion 222 arranged between the at least two adjacent mounting portions 221, and an outer peripheral portion 223 arranged on sides of at least two mounting portions 221 away from the corresponding connecting portion 21. The outer peripheral portion 223 of each of the elastic portions 22 is connected with the at least two mounting portions 221 and the spaced portion 222 of each of the elastic portions 22. The outer peripheral portion 223 of each of the elastic portions 22 is connected with edges of two adjacent detecting components 31. The driving transducers 24 are arranged on the mounting portions 221.

In the embodiment, the drive mode of the MEMS gyroscope is a differential comb drive, which effectively improves stability of drive of the MEMS gyroscope, at the same time achieves a large driving displacement; increases mechanical sensitivity of the, EMS gyroscope, and is beneficial to bias stability of the detecting components. Meanwhile, since the two mass blocks 311 of each of the detecting components are in opposite phases and rotate around the center of the anchor point 1, and because the connecting portions 21 and the anchor point 1 are connected by the flexible beams 23, and the connecting portions 21 are connected with the mass blocks 311, the MEMS gyroscope has freedom to perform in-plane rotational, has low anchor point loss, and has greater area utilization. Further, such arrangements also increase the sensitivity of the detecting components, reduce mechanical noise of the MEMS gyroscope, increase an area utilization rate of a chip, and realize miniaturization of the MEMS gyroscope.

Specifically, the anchor point 1 is arranged in the central area of the MEMS gyroscope, and the connecting portions 21 are arranged around the anchor point 1 for mounting the flexible beams 23.

The two mass blocks 311 of each of the two detecting components 31 are arranged at intervals, and are connected with the anchor point 1 by corresponding flexible beams 23 and the connecting portions 21. That is, first ends of the two mass blocks 311 of each of the two detecting components 31 on the same side are connected by the anchor point 1, and second ends of the two mass blocks 311 of each of the two detecting components 31 are separated from each other. At this time, a connecting line between the anchor point 1 and the interval between the two mass blocks 311 on the same side is used as a dividing line, and the two mass blocks 311 on the same side are divided into two independent components. An extension line of the connecting line also divides the other two mass blocks 311 on the other side into two independent components. The two elastic portions 22 are connected by the connecting portions 21. That is, each of the elastic portions 22 extends outward from the corresponding connecting portion 21, and two ends of an extending side of each of the elastic portions 22 are connected with the adjacent edges of the two detecting components 31. That is, two ends of an extending side of each of the elastic portions 22 are connected with edges of two mass blocks arranged on a same side of the dividing line. When the MEMS gyroscope is in the driving mode, the two mass blocks 311 of a same detecting component 31 are in opposite phases and move concentrically around the anchor point 1. Since the elastic portions 22 are elastic, the elastic portions 22 are compressed at this time, and the two mass blocks 3111 of the other detecting component 31 move concentrically around the anchor point 1 and move toward each other. Several fixed comb-tooth electrodes and movable comb-tooth electrodes are staggered to form several differential capacitors. The fixed comb-tooth electrodes and the movable comb-tooth electrodes arranged on the elastic portions 22 are configured for detection and generating external driving force for driving the MEMS gyroscope to vibrate in the drive mode. It should be noted that the flexible beams 23 are arranged at intervals around the anchor point 1 and the first accommodating grooves 11 are arranged at intervals around the anchor point 1.

Optionally, the flexible beams 23 and the first accommodating grooves 11 arranged on a same side of the dividing line are arranged at equal angular intervals around the anchor point 1. The mounting portions 221 are arranged at equal angular intervals around the anchor point 1. The spaced portions are arranged at the intervals of the mounting portions to provide compression areas when the elastic portions 22 are compressed. The outer peripheral portions 223 are respectively connected with the adjacent edges of the two detecting components 31.

Furthermore, the coupling beams 4 connect the two connecting portions 21.

The anchor point 1 comprises second accommodating grooves 12 for accommodating the coupling beams 4. Each of the second accommodating grooves 12 comprises a mounting groove 121 provided between the two connecting portions 21 and two coupling grooves 122 provided on opposite sides of the mounting groove 121. The coupling grooves 1222 have a same structure. Each mounting groove 121 is communicated with corresponding two coupling grooves 122. One end of each of the coupling grooves 122 close to the anchor point 1 defines an opening 1221. Each of the coupling grooves 122 comprises a plurality of bending portions 1222.

Each of the coupling beams 4 comprises a mounting beam 41 arranged in a corresponding mounting groove 121 and two elastic arms 42. A first end of each of the elastic arms 42 is connected with a corresponding mounting beam 41 a second end of each of the elastic arms 42 is connected with a corresponding connecting portion 21. Each of the elastic arms 42 are arranged in a corresponding coupling groove 122 and extends from a corresponding openings 1221 to connect with the corresponding connecting portion 21.

Each of the detecting transducers 312 comprises a positive electrode 3121 and a negative electrode 3122. The positive electrode 3121 and the negative electrode 3122 of each of the detecting transducers 312 are arranged above or below the two mass blocks 311 of each of the detecting components 31. The positive electrodes 3121 and the negative electrodes 3122 of the detecting transducers 312 are symmetrically arranged with respect to the anchor point 1 and are separately arranged on a corresponding mass block 311 of a corresponding detecting component 31.

In the embodiment, when the MEMS gyroscope is in the sense mode, the mass blocks vibrates in opposite phases, and a total moment of the MEMS gyroscope is balanced, so differential detection of the MEMS gyroscope is realized; influence of acceleration shock and quadrature error is effectively avoided. The connecting portions 21 are elastically connected through the coupling beams, so as to realize the anti-phase motion between different mass blocks 311, and effectively form differential detection.

Specifically, ends of each two adjacent connecting grooves 112 away from the anchor point 1 are connected by an annular gap 25. A thickness of each annular gap 25 is greater than a thickness of a groove wall of each connecting groove 112, and the thickness of each annular gap 25 is greater than a thickness of a groove wall of each of the second accommodating grooves 12. When the MEMS gyroscope is in the sense mode, the two mass blocks 311 of each detecting components are oscillated in opposite phases, the large thickness of each annular gap 25 avoids breakage and plays an excellent role in strengthening and fixing. The two coupling beams 4 are correspondingly arranged on two sides of the annular gaps 25, and the two second accommodating grooves 12 are correspondingly disposed on the two sides of the annular gaps 25. Further, an interval between two adjacent connecting grooves 112 on the same side of the dividing line is less than an interval between two adjacent connecting grooves 112 on the different side of the dividing line. Each of the second accommodating grooves 12 is provided on the interval between each two adjacent connecting grooves 112 on the different side of the dividing line. Each of the second accommodating grooves 12 is connected with a corresponding annular gap 25. The two second accommodating grooves 12 are oppositely arranged on two sides of the anchor point 1.

The coupling beam 4 is an elastic structure, and the bending portions 1222 of the corresponding coupling groove 122 enhance structural strength of the corresponding coupling beam 4, buffer the strength of the two mass blocks 311 when they are oscillated in opposite phases, and increase toughness between the corresponding coupling beam 4 connecting the corresponding annular gap 25 and the corresponding connecting portion 21 and avoid breaking of the corresponding coupling beam 4. The two connecting portions 21 are elastically connected through the coupling beams 4 to realize the anti-phase motion between the different mass blocks 311, which effectively forms the differential detection. It should be noted that, in the embodiment, at least seven bending portions 1222 are provided on each coupling groove, which enhance the toughness and strength of the coupling beams 4 to a great extent.

One positive electrode 3121 and one negative electrode 3122 are respectively arranged on the two mass blocks 311 on the same detecting component 31, and one positive electrode 3121 and one negative electrode 3122 are respectively arranged on the two mass blocks 311 on the same side of the dividing line. At this time, the positive electrodes 3121 and the negative electrode s3122 forms a number of capacitors to detect the vibration displacement of the MEMS gyroscope along the vibration direction of the sense mode.

In summary, the MEMS gyroscope based on the rotation mode provided by the present disclosure is not only convenient for realizing the differential detection but also improve the sensitivity and the signal-to-noise ratio of the detection of the MEMS gyroscope.

The drive mode of the MEMS gyroscope is a differential comb drive, which effectively improves stability of drive of the MEMS gyroscope while achieves a large driving displacement; increases the mechanical sensitivity of the MEMS gyroscope, and is beneficial to the bias stability of the detecting components. In the sense mode of the MEMS gyroscope, the mass blocks oscillate in opposite phases, which realizes the differential detection of the MEMS gyroscope and effectively avoids the. Influence of acceleration shock and quadrature error. Further, the structure of the MEMS gyroscope has low anchor loss, great area utilization, and miniaturization of the MEMS gyroscope.

The above are only optional embodiments of the present disclosure, it should be pointed out that for those of ordinary skill in the art, and improvements can be made without departing from the inventive concept of the present disclosure, which should all fall within the protection scope of the present disclosure.

What is claimed is:

1. A micro-electro-mechanical system (MEMS) gyroscope based on a rotation mode, comprising:
    an anchor point;
    at least two driving structures elastically connected with an outer side of the anchor point;
    a mass group connected with the driving structures; and
    coupling beams connected with adjacent driving structures;
    wherein the mass group comprises two detecting components respectively connected with one side of each of the driving structures away from the anchor point, the two detecting components are arranged on opposite sides of the driving structures; each of the detecting components comprises two mass blocks arranged at intervals and detecting transducers arranged below or above the mass blocks; the mass blocks are connected with the driving structures; at least a portion of each of the mass blocks extends to an outside of a corresponding driving structure.

2. The MEMS gyroscope based on the rotation mode according to claim 1, wherein an included angle between one side of a first mass block of each of the detecting components away from a second mass block of each of the detecting components and one side of the second mass block away from the first block of each of the detecting components is less than 180°.

3. The MEMS gyroscope based on the rotation mode according to claim 1, wherein the driving structures comprise two connecting portions arranged on two opposite sides of the anchor point and two elastic portions arranged on the two opposite sides of the anchor point; each of the elastic portions is connected with one side of a corresponding connecting portions away from the anchor point; the two elastic portions are arranged at intervals; two ends of each of the elastic portions are respectively connected with the adjacent edges of the two detecting components.

4. The MEMS gyroscope based on the rotation mode according to claim 3, wherein each of the driving structures further comprises at least two flexible beams connecting the anchor point and a corresponding connecting portion; the anchor point comprises first accommodating grooves for accommodating the flexible beams.

5. The MEMS gyroscope based on the rotation mode according to claim 4, wherein each of the first accommodating grooves comprises a main groove close to the anchor point and a connecting groove extending from the main groove in a direction away from the anchor point; each of the flexible beams comprises a connecting beam and a fixed beam; a first end of each connecting beam is connected with a corresponding connecting portion and a second end of each connecting beam is inserting into a corresponding connecting groove; a first end of each fixed beam is connected with a corresponding connecting beam and a second end of each fixed beam is connected with the anchor point; each fixed beam is accommodated in the corresponding main groove.

6. The MEMS gyroscope based on the rotation mode according to claim 4, wherein the coupling beams connect the two connecting portions.

7. The MEMS gyroscope based on the rotation mode according to claim 6, wherein the anchor point comprises second accommodating grooves for accommodating the coupling beams; each of the second accommodating grooves comprises a mounting groove provided between the two connecting portions and two coupling grooves provided on opposite sides of the mounting groove; the coupling grooves have a same structure; each mounting groove is communicated with corresponding two coupling grooves; and one end of each of the coupling grooves close to the anchor point defines an opening; each of the coupling beams comprises a mounting beam arranged in a corresponding mounting groove and two elastic arms; a first end of each of the elastic arms is connected with a corresponding mounting beam a second end of each of the elastic arms is connected with a corresponding connecting portion; each of the elastic arms are arranged in a corresponding coupling groove and extends from a corresponding openings to connect with the corresponding connecting portion.

8. The MEMS gyroscope based on the rotation mode according to claim 3, wherein each of the detecting transducers comprises a positive electrode and a negative electrode; the positive electrode and the negative electrode of each of the detecting transducers are arranged above or below the two mass blocks of each of the detecting components; the positive electrodes and the negative electrodes of the detecting transducers are symmetrically arranged with respect to the anchor point and are separately arranged on a corresponding mass block of a corresponding detecting component.

9. The MEMS gyroscope based on the rotation mode according to claim 3, wherein the driving structures further comprise driving transducers arranged on the elastic portions.

10. The MEMS gyroscope based on the rotation mode according to claim 9, wherein each of the elastic portions comprises at least two mounting portions arranged on one side of a corresponding connecting portion away from the anchor point, a spaced portion arranged between the at least two adjacent mounting portions, and an outer peripheral portion arranged on sides of at least two mounting portions away from the corresponding connecting portion; the outer peripheral portion of each of the elastic portions is connected with the at least two mounting portions and the spaced portion of each of the elastic portions; the outer peripheral portion of each of the elastic portions is connected with edges of two adjacent detecting components; the driving transducers are arranged on the mounting portions.

* * * * *